F. HENNEBÖHLE.
TWO-FLUID CONTROL VALVE.
APPLICATION FILED APR. 23, 1917.

1,294,461.

Patented Feb. 18, 1919.
2 SHEETS—SHEET 1.

Witness:
R. L. Farrington

Inventor: Frank Henneböhle
by Albert Scheible, Attorney

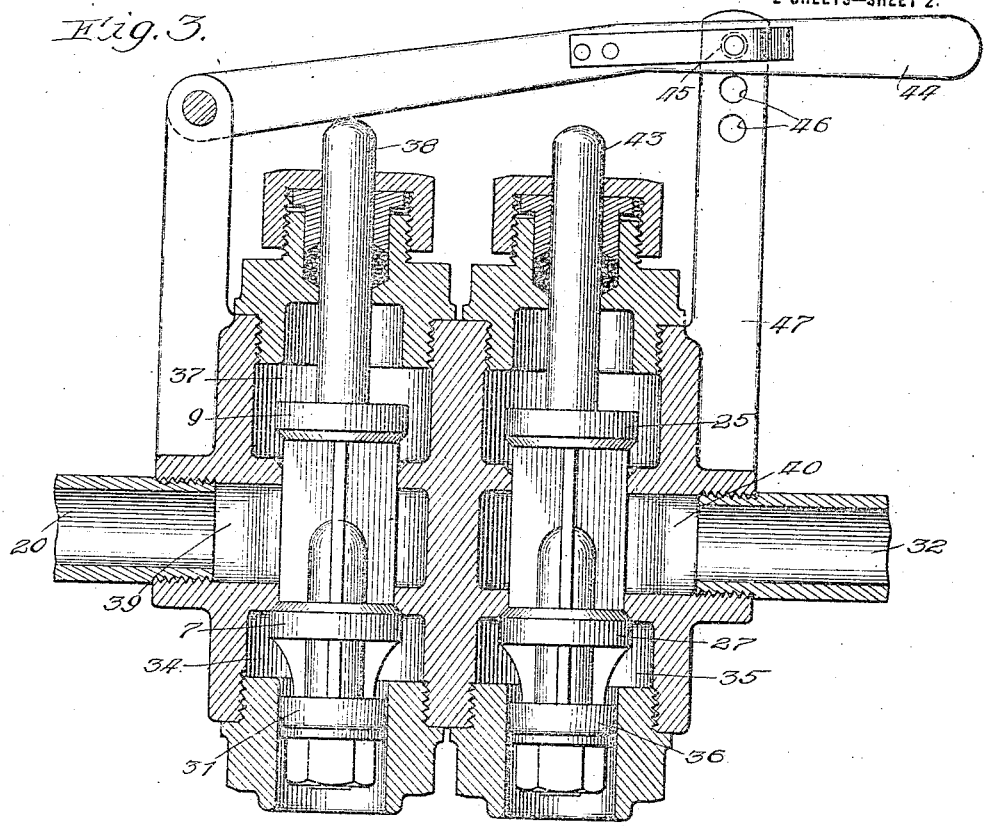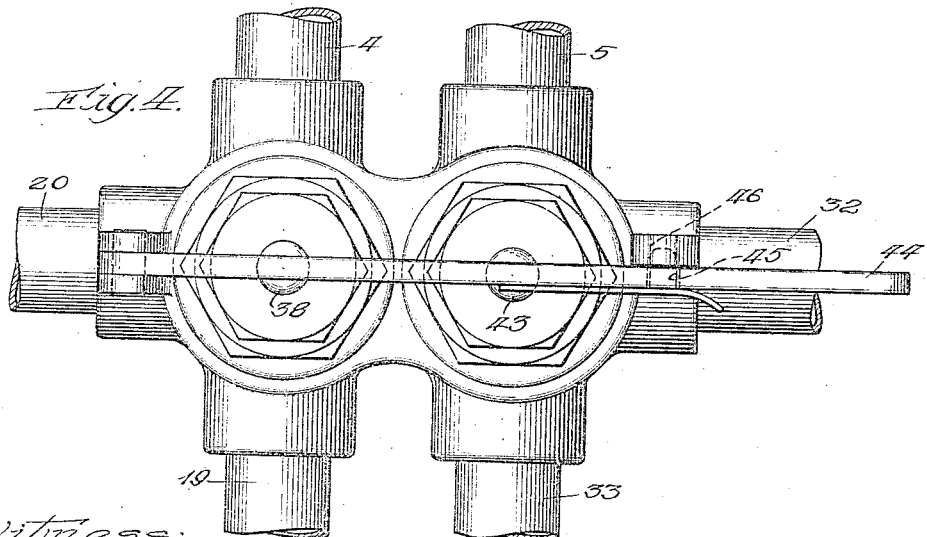

UNITED STATES PATENT OFFICE.

FRANK HENNEBÖHLE, OF CHICAGO, ILLINOIS.

TWO-FLUID-CONTROL VALVE.

1,294,461.  Specification of Letters Patent.  Patented Feb. 18, 1919.

Application filed April 23, 1917. Serial No. 163,806.

*To all whom it may concern:*

Be it known that I, FRANK HENNEBÖHLE, citizen of the United States, residing at Chicago, Illinois, have invented certain new and useful Improvements in Two-Fluid-Control Valves; and I do hereby declare the following to be a full, clear, and exact description of the invention, such as will enable others skilled in the art to which it appertains to make and use the same.

My invention relates to valves for controlling the supply of two fluids, both available under pressure, its general objects being to provide a simple, inexpensive and easily manipulated mechanism for controlling the two fluid-supply passages in a definite order. More particularly, my invention relates to means for effecting such a non-simultaneous control of the two fluids by the movement of a single hand lever, and preferably also for making the time interval between the opening or closing of the two fluid-supply passages dependent on the effective pressure of one of the fluids. Still other objects will appear from the following specification and from the accompanying drawings, in which—

Fig. 3 is a vertical section through an alternative type of valve mechanism in which each movable valve member is moved mechanically by the operating lever.

Fig. 4 is a top view of the appliance of Fig. 3.

Figure 1:
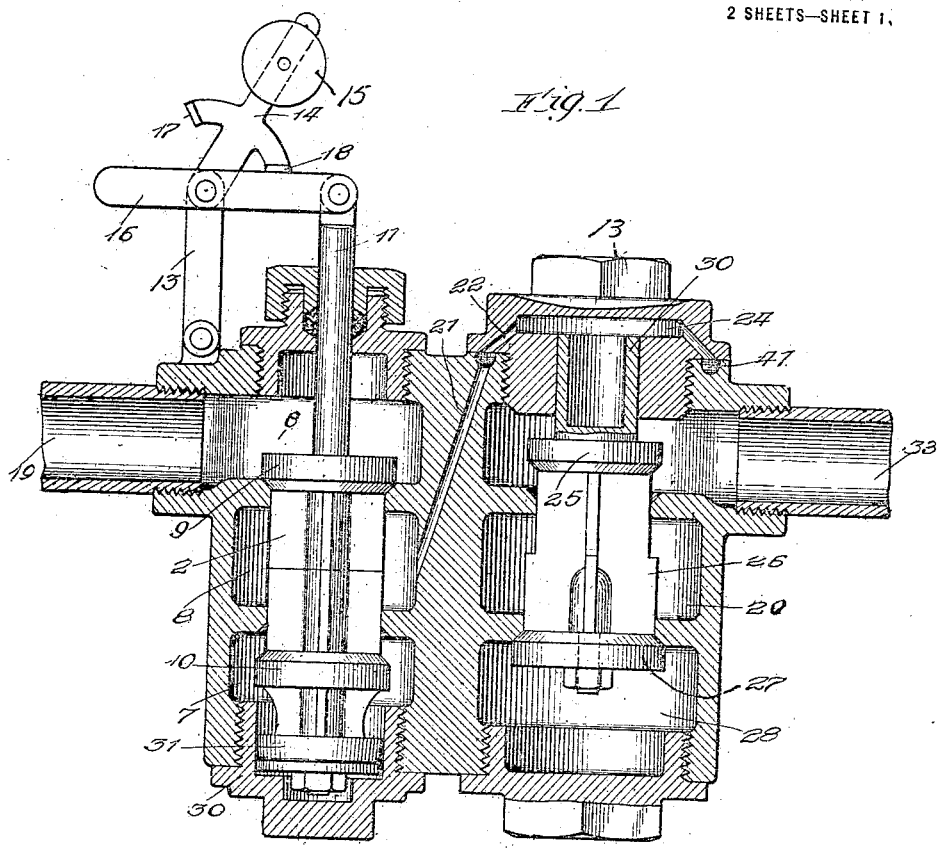
Figure 1 is a vertical section through a valve mechanism embodying the preferred form of my invention.

In certain manufacturing operations, where two separate fluids are used in a given connection, it is essential that one of these should be effectively applied before the other is turned on, and that the disconnection should be in the reverse order.

For example, in vulcanizing rubber tires, the tires are placed in molds formed of several parts, which molds are kept tightly closed by hydraulic pressure, and steam at a lesser pressure is admitted to the interior of each tire while the mold is kept closed. In this case, it is essential that the mold be firmly held under pressure before the steam is admitted to the interior of the tire, and likewise essential that the pressure within the tire be discontinued (or at least greatly reduced) before the pressure on the mold parts is relaxed. Where the two fluids are controlled by separate, manually operable valves, as has heretofore been the custom, the admitting of the steam into the tire before the mold parts are tightly clamped by the hydraulic pressure will partly spoil the tire, as also happens in case the hydraulic pressure is relaxed while a considerable pressure is still maintained within the tire. On the other hand, any needless interval of time between the separate controlling of the valves means a reduction in hourly output and a waste of the time of several workmen. To overcome both of these objections, I preferably provide a mechanism constructed as in Figs. 1 and 2; that is to say, one in which the steam-admitting valve is partly responsive to the pressure of the compressed fluid acting on the mold parts. Both of the movable valve members 2 and 26 are desirably vertically mounted in a single body equipped with inlets 4 and 5 for the hydraulic fluid and the steam respectively. For the water-control valve, I preferably use a balanced wing valve having upper and lower disks 9 and 10 disposed respectively in a chamber 6 permanently connected to an exhaust pipe 19, and in a chamber 7 permanently connected to an inlet pipe 4. The chamber 7 has at its lower end a cylindrical extension 30 housing a piston 31 which is fast upon the valve stem carrying the disks 9 and 10 and substantially equal in effective diameter to the latter, so that the pressure of fluid in the chamber 7 will act equally in opposite directions on the valve and hence maintain the same substantially balanced.

Interposed between the inlet chamber 7 and the outlet chamber 6 is an intermediate chamber 8, which is spaced from both of the chambers 6 and 7 by walls having alined perforations through which extend the winged portion of the movable valve member 2. Fast with respect to these disks and the wings connecting the same is a stem 11 extending through a stuffing box 12 at the top of the valve body and jointed to a substantially horizontal rocking lever 16 which in turn is pivoted on a link 13. Pivoted also on the link 13 is an arm 14 carrying a weight 15 and having fingers 17 and 18 adapted to bear on the lever 16 respectively on opposite sides of the pivot of the latter.

Figure 2:
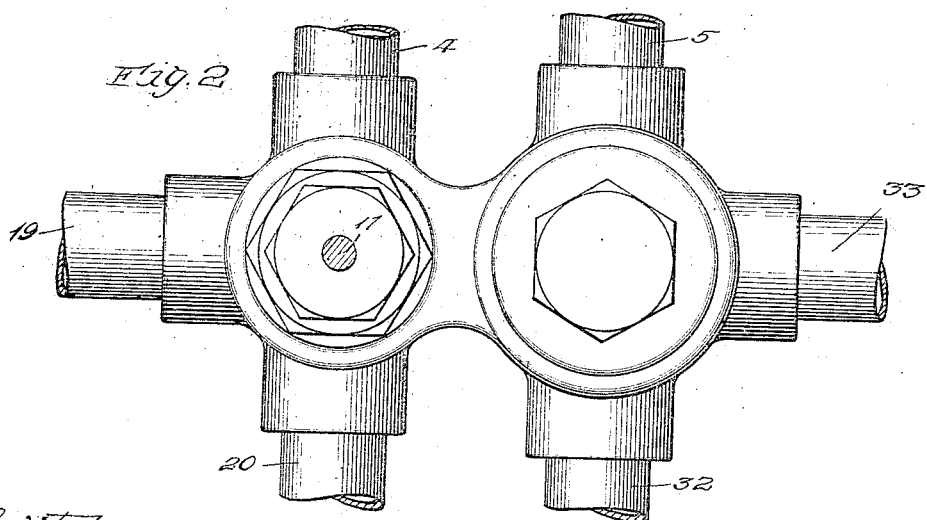
Fig. 2 is a top view of the valve of Fig. 1 with the weighted arm and link omitted.

To open the water-inlet valve, the arm 14 is thrown to the right, as shown in Fig. 1, thereby causing this weighted arm to depress the right-hand end of the rocking lever 16 and hence depressing the movable valve member to the position of Fig. 1. This forces the upper disk 9 upon its seat, thus disconnecting the middle chamber 8 from the upper chamber 6 and the exhaust pipe 19 leading from the latter, while also connecting the water inlet 4 through the chamber 7 with the middle chamber 8 and hence with the mold-pressing cylinders which are connected to the chamber 8 through a duct 20.

From the middle chamber 8 a cored passage 21 leads to an annular duct 41 which in turn is connected by a passage 22 in the cap 23 to a chamber 24 at the upper end of the guide for the steam control valve member. The latter has an upper disk 25 connected by a winged stem 26 with a lower disk 27, which latter normally engages a seat in a wall separating the lower chamber 28 from an intermediate chamber 29. The chamber 28 is continuously connected to the steam inlet 5, so that the steam normally exerts an upward pressure on the lower disk 27, and therefore normally holds this valve member in its raised position of Fig. 1, in which figure the rocking arm is assumed just to have been tilted to the position indicated. With the water (say at 500 lbs. initial pressure) thus admitted by the left-hand valve to the mold-press, the pressure of the fluid in the press (and hence also in the chambers 8 and 24) soon rises and exerts a downward pressure on the hollow piston 30 which projects into the chamber 24. When this pressure becomes sufficiently great to counteract the upward pressure (of say 300 lbs.) on the disk 27, the steam-controlling valve member is forced downward, thereby unseating the disk 27 and connecting the steam inlet chamber 28 with the intermediate chamber 29, which latter is connected by a pipe 32 with the interior of the tire, while seating the upper disk 25 and hence disconnecting the intermediate chamber 29 from the exhaust pipe 33.

When the tire has been vulcanized, the arm 14 is thrown to the left, thereby rocking the lever 16 in a counter-clockwise direction and raising the left-hand valve member so as to unseat the upper disk 9 and seat the lower disk 10. This disconnects the chamber 8 and the passages leading therefrom from the supply of liquid under pressure, and connects these portions (including the chamber 24 and the mold-press cylinder) with the exhaust 19. Consequently, the pressure in these interiors will gradually fall as the liquid is discharged through the exhaust pipe, but as long as this pressure in the chamber 24 effectively exceeds that of the steam in the chamber 28, the right-hand valve remains in its lowered position. When the said pressure in the chamber 24 falls below this requisite amount, the steam pressure in the chamber 28 will force the disk 27 upwardly and on to its seat, thus disconnecting the supply of steam from the chamber 26 and the tires connected with the latter, and connecting both of the latter with the exhaust 33.

It will be obvious that by varying the proportions of the disk 27 and the piston 30, the pressure in the chamber 24 at which the adjacent valve member is moved in either direction may readily be varied, and in any case, the steam-controlling valve member will not move until the pressure in the chamber 24 (and hence that in the mold-press) passes a predetermined amount. Consequently, the simple movement of the weighted lever in either direction will automatically control both fluids at time intervals dependent on the effective pressure in the mold-press, so as not to admit steam to the interior of the tire until the mold parts are clamped with a predetermined pressure, while still maintaining the steam pressure as long as this can be done with safety.

However, while I have shown and described a mechanism in which the valve members are operatively connected by one of the fluids, I do not wish to be limited to this or other details of the construction and arrangement above described, nor to the use of my appliance for the purpose above mentioned. For example, the two valve members may be mechanically controlled for non-simultaneous operation by a single manual lever, as in Figs. 3 and 4. In this embodiment, the left-hand valve portion has an inlet chamber 34 housing a disk 7 and a smaller piston 31, while the steam inlet chamber 35 likewise houses a disk 27 and a smaller piston 26. Fast with respect to the disk 7 and piston 31 are an upper disk 9 located in an exhaust chamber 37 and a stem 38 projecting through a stuffing box at the top of the valve body, the disks 7 and 9 being spaced by wings extending slidably through perforations in walls at opposite sides of a chamber 39 connected by a pipe 20 with the mold press cylinders. The other valve member likewise has wings extending through a chamber 40 connected by a pipe 32 with the interiors of the tires, and a stem 43 projecting through the top of the valve body. Pivoted on the valve body is a hand lever 44 which may be locked in several positions by any suitable means, as by a spring-pressed pin 45 entering holes 46 in a guide 47. With both fluids connected respectively to the lowermost valve chambers, both of the movable valve members in Fig. 3 will be normally pressed upward by these fluids. However, upon depressing the hand lever 44, the stem 38 will be forced downward and this lever may then be locked by the pin 45 in the intermediate position in which the lever barely touches the tip of the stem 43, thus connecting the liquid with the mold-press cylinders. Then, when the pressure in the latter reaches the desired amount (or after the corresponding time interval as learnt from practice), the lever 44 is moved further and locked in a position in which it also depresses the stem 43 and connects the supply of steam with the pipe 32 and hence with the interior of the tires. On reversing the movement of the lever 44 and first latching it in its intermediate position, the steam will be disconnected from the tires while the hot water is still maintaining its pressure on the molds; and on raising the lever further, the hot water pressure will then be cut off from the mold press.

I claim as my invention:

1. In a valve, the combination of a valve member arranged for connecting a given chamber either with fluid under pressure or with an exhaust passage, of a second valve member arranged for controlling the admission and exhaust of another fluid to and from another chamber, said second valve member being differentially responsive to the fluid pressure in the first named chamber and to the entrance pressure of the last named fluid.

2. In a valve, the combination of a valve member arranged for connecting a given chamber either with fluid under pressure or with an exhaust passage, of a second valve member arranged for controlling the admission and exhaust of another fluid to and from another chamber, said second valve member being differentially responsive to the fluid pressure in the first named chamber and to the entrance pressure of the last named fluid, the fluid-pressed faces of the second valve member being of inverse sizes as related to the pressures of the fluids acting thereon.

Signed at Chicago, April 19th, 1917.

FRANK HENNEBÖHLE.

Copies of this patent may be obtained for five cents each, by addressing the "Commissioner of Patents, Washington, D. C."